(12) United States Patent
McConnell et al.

(10) Patent No.: US 7,218,745 B2
(45) Date of Patent: May 15, 2007

(54) HEADLINER TRANSDUCER COVERS

(75) Inventors: John E. McConnell, Ann Arbor, MI (US); Justin Putti, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 274 days.

(21) Appl. No.: 10/327,824

(22) Filed: Dec. 23, 2002

(65) Prior Publication Data

US 2004/0120536 A1    Jun. 24, 2004

(51) Int. Cl.
*H04R 1/02* (2006.01)
(52) U.S. Cl. .................... 381/302; 381/152; 381/389
(58) Field of Classification Search ................. 381/86, 381/87, 114, 152, 173, 189, 190, 191, 389, 381/396, 431; 264/272.11, 258
See application file for complete search history.

(56) References Cited

U.S. PATENT DOCUMENTS

| | | | |
|---|---|---|---|
| 1,930,577 A | 10/1933 | Atkinson |
| 2,060,666 A | 11/1936 | Ellmore |
| 2,069,328 A | 2/1937 | Rockwell |
| 3,158,835 A | 11/1964 | Hipkins |
| 4,005,761 A | 2/1977 | Okamoto et al. |
| 4,056,165 A | 11/1977 | Okamoto et al. |
| 4,119,794 A | 10/1978 | Masamitsu |
| 4,132,859 A | 1/1979 | Ranga |
| 4,256,797 A | 3/1981 | Stamper et al. |
| 4,329,544 A | 5/1982 | Yamada |
| 4,330,584 A | 5/1982 | Doerer |
| 4,358,883 A | 11/1982 | Gerring |
| 4,363,848 A | 12/1982 | Le Duc et al. |
| 4,385,210 A | 5/1983 | Marquiss |
| 4,385,955 A | 5/1983 | Doerfling et al. |
| 4,594,729 A | 6/1986 | Weingartner |
| 4,641,345 A | 2/1987 | Takahashi |
| 4,673,056 A | 6/1987 | Koppelomaki |
| 4,703,502 A | 10/1987 | Kasai et al. |
| 4,769,843 A | 9/1988 | Imai et al. |
| 4,792,978 A | 12/1988 | Marquiss |
| 4,828,910 A | 5/1989 | Haussling |

(Continued)

FOREIGN PATENT DOCUMENTS

DE    36 03 198 A1    10/1986

(Continued)

OTHER PUBLICATIONS

Soren Bech, Electroacoustic Simulation of Listening Room Acoustics. Psychoacoustic Design Criteria, Audio Engineering Society, 89$^{th}$ Convention Sep. 21-25, 1990, Los Angeles, USA, 34pp.

(Continued)

*Primary Examiner*—Sinh Tran
*Assistant Examiner*—Walter F Briney, III
(74) *Attorney, Agent, or Firm*—Brooks Kushman P.C.

(57) ABSTRACT

A vehicle headliner includes electromagnetic drivers for sonically driving a member or a layer of the headliner. A foam beam is shaped around a driver transducer connection area that holds one or more driver connectors. A cover may be maintained over the shaped foam beam to protect against entry of dust and other debris into the driver and the transducer connection area that receives the driver.

8 Claims, 4 Drawing Sheets

U.S. PATENT DOCUMENTS

| | | |
|---|---|---|
| 4,856,071 A | 8/1989 | Marquiss |
| 4,924,962 A | 5/1990 | Terai et al. |
| 4,953,213 A | 8/1990 | Tasaki et al. |
| 4,953,219 A | 8/1990 | Kasai et al. |
| 4,968,154 A | 11/1990 | Baeg |
| 4,972,489 A | 11/1990 | Oki et al. |
| 5,007,976 A | 4/1991 | Satterfield et al. |
| 5,016,934 A | 5/1991 | Pelz |
| 5,068,001 A | 11/1991 | Haussling |
| 5,129,004 A | 7/1992 | Imai et al. |
| 5,155,770 A | 10/1992 | Maejima |
| 5,172,415 A | 12/1992 | Fosgate |
| 5,193,118 A | 3/1993 | Latham-Brown et al. |
| 5,280,991 A | 1/1994 | Weiland |
| 5,450,057 A | 9/1995 | Watanabe |
| 5,481,618 A | 1/1996 | Ross et al. |
| 5,503,903 A | 4/1996 | Bainbridge et al. |
| 5,586,385 A | 12/1996 | Nishino et al. |
| 5,591,289 A | 1/1997 | Souders et al. |
| 5,606,623 A | 2/1997 | Bahm, III et al. |
| 5,617,480 A | 4/1997 | Ballard et al. |
| 5,710,818 A | 1/1998 | Yamato et al. |
| 5,754,664 A | 5/1998 | Clark et al. |
| 5,841,081 A | 11/1998 | Thompson et al. |
| 5,887,071 A | 3/1999 | House |
| 5,901,231 A | 5/1999 | Parrella et al. |
| 5,939,682 A | 8/1999 | Hartmann |
| 5,976,295 A | 11/1999 | Ang |
| 6,008,149 A | 12/1999 | Copperwheat |
| 6,058,196 A | 5/2000 | Heron |
| 6,181,797 B1 | 1/2001 | Parrella et al. |
| 6,206,999 B1 | 3/2001 | Ritto et al. |
| 6,356,641 B1 * | 3/2002 | Warnaka et al. ............ 381/190 |
| 6,375,778 B1 | 4/2002 | Schulz et al. |
| 6,377,695 B1 | 4/2002 | Azima et al. |
| 6,555,042 B1 * | 4/2003 | Mola et al. ................. 264/258 |
| 2001/0001687 A1 * | 5/2001 | Pokorzynski et al. .... 428/318.6 |
| 2001/0012369 A1 | 8/2001 | Marquiss |

FOREIGN PATENT DOCUMENTS

| | | |
|---|---|---|
| DE | 44 31873 A1 | 3/1995 |
| DE | 199 03 393 A1 | 8/2000 |
| EP | 0 411 786 A1 | 2/1991 |
| GB | 1 555 409 | 11/1979 |
| GB | 2 134 464 A | 8/1984 |
| IT | 671885 | 10/1964 |
| JP | 4 97699 | 3/1992 |
| JP | 4-97700 | 3/1992 |
| JP | 4-114600 | 4/1992 |
| WO | 98/13942 | 4/1998 |
| WO | 98/16409 | 4/1998 |
| WO | 98/42536 | 10/1998 |
| WO | WO 99/11490 | 3/1999 |
| WO | WO 01/15489 | 3/2001 |

OTHER PUBLICATIONS

Junger, M, et al., Sound, Structures and Their Interaction, 1972, Cambridge, MA, MIT Press, pp. 234-236.

Pierce, A., Acoustics, Acoustical Society of America, Woodbury, NY, 1989, p. 128.

* cited by examiner

HEADLINER TRANSDUCER COVERS

BACKGROUND OF THE INVENTION

1. Field of the Invention

This invention relates to vehicular audio systems in which a headliner includes electromagnetic transducer assemblies for driving a sound radiating lower surface of the headliner with covers protecting the transducers.

2. Background Art

Audio systems continue to be developed for improving the utility and sound quality of communication systems and audio systems in a vehicle. Although distribution of a transducers emanating the sounds has been accomplished in many ways, traditional transducers in which the voice coil in a magnetic field moves a diaphragm integrally formed with the speaker in a framed construction, are not readily adapted to be housed in the headliner area because of their size and weight. As a result, many audio systems avoid placement of transducers in the headliner despite the close proximity of the headliner to the ears of passengers in the vehicle.

A previously known headliner construction for including transducers in the headliner is defined in U.S. patent application Ser. No. 09/121,788 in which the transducers are specially constructed audio speakers, for example thin speakers known as "Active Screen Speakers" manufactured by American Power and Light of Plymouth, California having a screen against which visual images may be projected. The headliner is manufactured with the speakers compression molded between material layers of the headliner. However, the sandwiching technique limits the use of these speakers to original equipment manufacturing production processes, and does not permit headliners to be retrofit with special purpose audio accessories or systems. Moreover, such constructions limit the types of speakers that may be employed with the headliner.

Another known vehicle audio system of U.S. patent application Ser. No. 09/382,851 discloses a vehicle audio system in which transducers are designed to interact with a sound emanating layer of the headliner and avoid the need for traditional cone diaphragms or the like. However, such transducers extend up above the headliner, and are exposed to dust and inadvertent contact with the environment during handling, assembly and production of the vehicle. Such exposure can adversely affect the performance of the speakers after vehicle assembly.

SUMMARY OF THE INVENTION

The present invention overcomes the above mentioned disadvantages by providing a headliner assembly, preferably in combination with other transducers where the electromagnetic assemblies such as OASys system drivers are protected by protectors including foam beams integrally constructed with the headliner and then covered. The headliner may include foam beam surrounds that enclose a motor connection area in which one or more driver housings can be coupled to the headliner. Preferably, the foam beams have a height substantially corresponding to the height of the motors so as to carry a cover over the OASys driver or other transducer that prevents the entry of dust and other environmental hazards to which the motor would otherwise be exposed.

In one embodiment of the invention, the beams are foamed in place upon a headliner blank or substrate. Such a foam operation can be incorporated in the same process and mold parts as used to provide energy absorbing pads, structural beams or the like in the headliner structure. Moreover, the foam beams are installed before the transducers are mounted so that the transducers remain protected when the headliner assembly is being handled and installed in the vehicle.

In another embodiment, the foam beams may be formed in a separate operation and adhered to a motor connection location on the headliner. As a result, whenever the headliner is to be modified to accommodate special order audio communication systems, the foam beams can be provided to protect newly appointed transducer connection locations in the headliner.

In any event, the foam beam enclosing the motor location protects the electromagnetic device installed from contamination, and when made of resilient material, protects from physical abuse during handling and installation of the headliner. Moreover, the foam structure can contribute to the structural stability of the headliner as well as the stability of the motor, the driver and the performance of the transducer as a whole, while reducing the impact of extraneous noise on the motor connection location that could otherwise inhibit the sound being emanated from the transducer formed by the headliner at the motor connection location.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which.

DETAILED DESCRIPTION OF THE PREFERRED EMBODIMENT(S)

Figure 1:
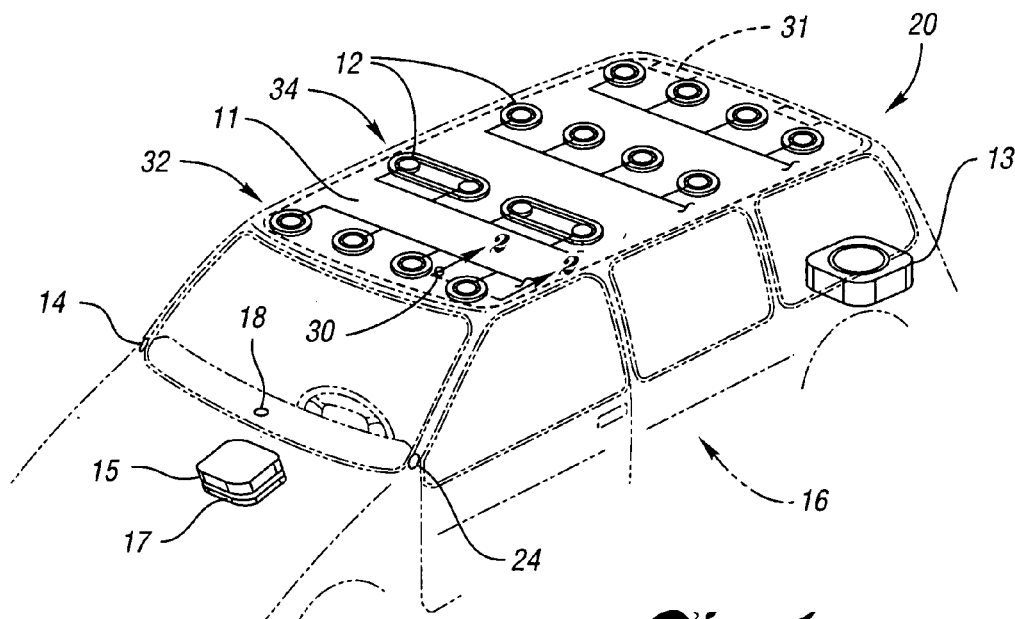
FIG. 1 is a perspective view of a vehicle, indicated by phantom lines, incorporating the headliner transducer of an audio system in accordance with the apparatus and method of the present invention.

Referring now to FIG. 1, there is illustrated a vehicle, generally indicated by reference numeral 10, including an audio system 20 embodying the invention. The audio system 20 includes either a commercially available audio or signal source 15 which may include a tuner, a cassette player, a compact disc player, a DVD player, or a telecommunications unit. In addition, the system 20 may be any unit incorporating any one of the above with additional signal processing circuitry 17 to provide signal delays, equalization and amplification as discussed in detail in related applications vertical headliner assembly with integral speakers, U.S. Ser. No. 09/121,788 and integrated panel loudspeaker system adapted to be mounted in a vehicle, U.S. Ser. No. 09/185,168 incorporated by reference. Nevertheless, the additional signal processing including signal delays and amplification as described below may be incorporated into a separate unit 17, without departing from the present invention. The headliner 11 includes at least one transducer or subassembly of transducer in a protector comprising a foam surround and a cover as described in greater detail below.

Processed audio signals of the source 15 and the signal processing/amplifier unit 17 are conducted via audio cabling to electromagnetic assemblies. The electromagnetic assemblies may be conventional transducers, for example, subwoofer 13 or in the form of subassembled divers 12 that are affixed to a headliner 11 which operates as a headliner speaker diaphragm per the disclosure in U.S. patent application Ser. No. 09/382,851 incorporated by reference. As used in this description, the drivers 12 comprise a motor 19, made up of a cup 20, magnet 25 and plate 21, together with a spider 22 and voice coil 27 subassembly. However, any part of the assembly that may be installed may be protected in accordance with the present invention, and the term driver connection location is not limited to the type or particular components assembled at that location.

Figure 2:
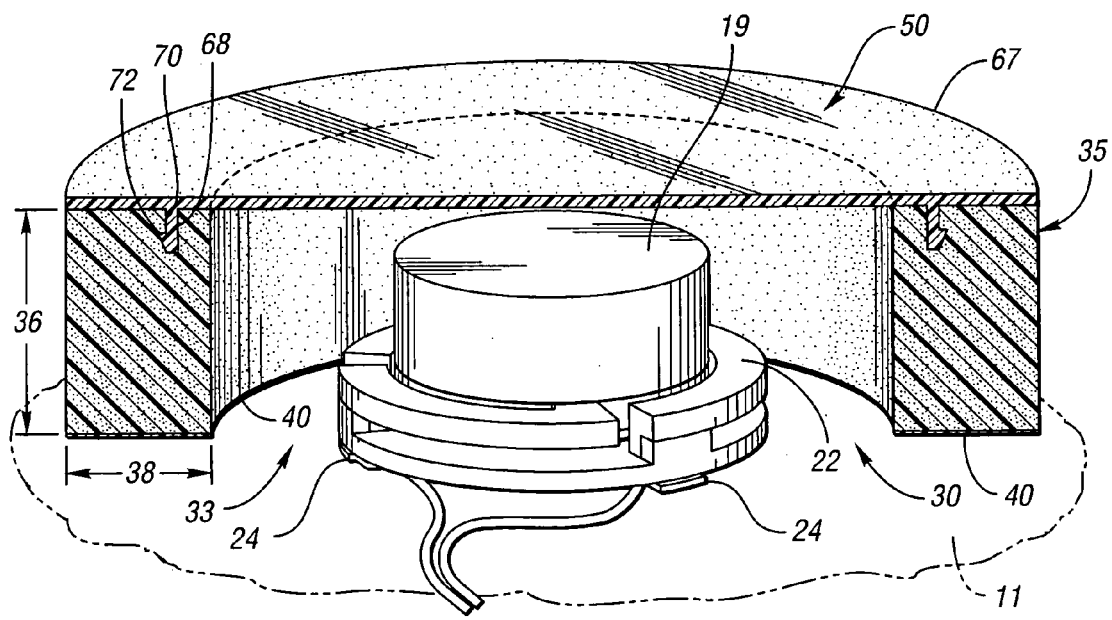
FIG. 2 is a perspective view of an electromagnetic motor transducer and surround assembly of the present invention.

Audio signals that are high passed and undeclared, but possibly equalized, are also sent to a set of forward mounted tweeters or speakers 14. The forward mounted speakers 14 may be conventional speakers and may be anywhere in front of the driver for optimal frontal imaging by those skilled in the art. Audio signals that are low passed, delayed and equalized are sent to a subwoofer 13 as illustrated in FIG. 2. The subwoofer 13 may be located anywhere in the vehicle 16 and delayed, crossed over and equalized to avoid localization and provide an even response.

The subassembled drivers 12 are placed in front of each listener, preferably some 12–16" in front of the ears and to each side for optimal left-right signal separation as best shown in FIG. 2. In the preferred embodiment, the first row 32 of subassembled drivers is placed near the windshield of the vehicle 16, the second row 34 is placed in front of the next seat to the rear such that they are forward enough from the second row occupants but not sufficiently close to the front row occupants to cause imaging confusion. Exact optimal dimensions depends on the degree of signal processing, output level and delay applied to each channel. The same technique is used for any subsequent rows of seating until one row of subassembled drive motors is placed behind the last row of listeners.

Figure 3:
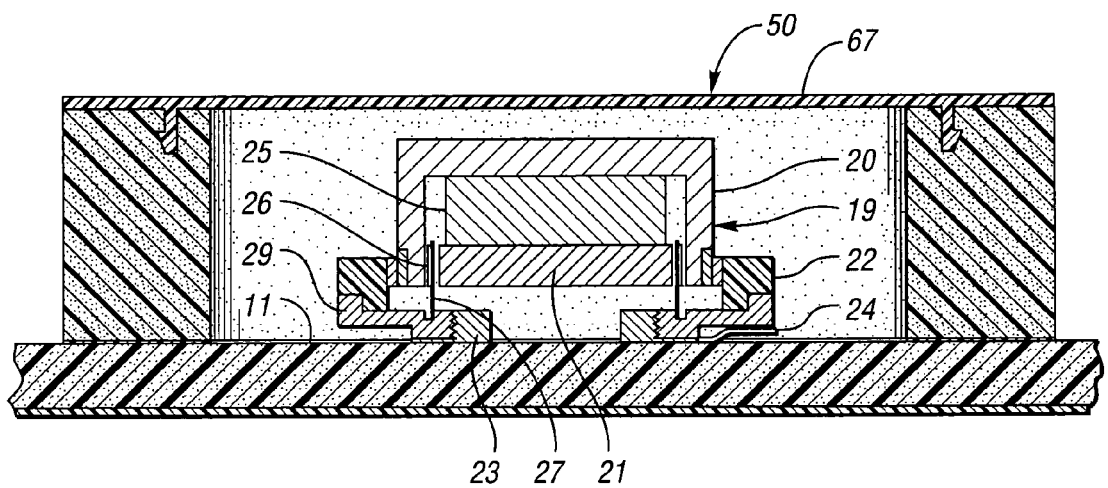
FIG. 3 is a sectional view, partially broken away, of the assembly shown in FIG. 2, on a top surface of a headliner with its covering material.

Referring now to FIGS. 2–3, the subassembled drivers 12 are designed and manufactured as individual electromechanical motors whose function is to convert electrical signals into mechanical motion. Preferably a permanent magnet field is achieved in a narrow voice coil gap 26 by use of a neodymium rare earth magnet 25, a high permeability steel cup 20 and a plate 21.

The magnet 25, cup 20, and plate 21 form a motor suspended by a one-piece, spider 22 tuned to a specific resonant frequency, preferably a frequency less than the audio spectrum of human hearing, or at least less than the lowest frequency at which the drivers are driven by the signal processing circuitry. A guide member 29 illustrated in FIG. 3 connected to the spider 22 serves to hold and center a voice coil 27 in the magnetic field gap 26 while removably attaching the rest of the subassembly to a motor base 23. The spider 22 and the guide member 29 could be made into one integral part in forming a driver 12.

The guide member 29 also contains two insert molded electrical contacts to which the voice coil 27 is soldered on one end and the other end mates with base contacts 24. The motor base 23 is directly adhered to the headliner 11 and contains insert molded electrical contacts that mate with the contacts of the guide member 29 on one end and are soldered to a signal wire (shown in FIG. 3) on the other end. Electrical contact between the base 23 and the guide member 29 may be made, for example, by metallizing the threads of the base 23 and the guide member 29.

Each driver 12 or other transducer are self-contained and designed to be assembled to the headliner 11 via the bases 23. Each driver 12 both creates an acoustically efficient connection between the driving force of the motor and the headliner speaker diaphragm 11 and provides a means of making electrical contact between the voice coil 27 and the signal wires. Of course, the particular construction of each assembly 12 may be varied as discussed in the U.S. patent application Ser. No. 09/382,851 as mechanical and electrical connection is made in one screw, snap-in, twist-lock or equivalent action. Furthermore, these connection options provide an easy method of servicing the assembly 12 should one of them fail.

The subassembled drivers 12 are sized in dimension, weight, and contact area to match the stiffness, shape, density and suspension points of the headliner 11 working as a speaker diaphragm. The excursion limits, power handling and efficiency of the drive motors 12 are also designed to match the physical characteristics of the headliner speaker diaphragm 11 and the air cavity between the headliner 11 and the diaphragm. In one application, the mass of the motor 12 is 94 grams, the resonant frequency of the spider is 50 Hz, the contact area is based on a 1" diameter voice coil 27, and the maximum excursion of the motor is 2.5 mm in either direction. The processed audio signals provided to the subassembled drive motors 12 causes mechanical motion which then moves the headliner speaker diaphragm 11 in accordance with the processed audio signal.

Boundary conditions of the headliner or panel 11 are not as critical as with a distributed mode sonic panel since the acoustic radiation is not dependent on the existence of nodes within the panel 11. However, the boundaries do need to be controlled to avoid excessive rattling at panels such as pillars. To achieve this, the majority of the perimeter is clamped with a semi-compliant membrane such as a window gasket. Additional compliant clamping such as weatherstrip may be employed at the boundaries of dome lamps, consoles and other structures penetrating the headliner 11. Furthermore, all signal and power wires above the headliner 11 are either clamped or integrated into the headliner diaphragm material.

In the preferred embodiment of the invention, the audio signal is first delivered to the high frequency speakers 14 as described above. Those skilled in the art of audio system tuning may then set the time delay and relative level of the audio signals delivered to the assemblies 12 on the headliner 11 so that the sound arriving at the occupant's ears enables the psycho-acoustic effect of precedence; this makes the image appear to come from in front of the occupants and not from the headliner 11 above. Since the precedence effect is both level and time dependent and since the interior acoustics dominate these settings, each vehicle 16 is tuned uniquely. In one instance of the invention, the audio signal fed to the front row 32 of assemblies 12 on a single thickness foam layer headliner may be delayed, for example, 7.5 milliseconds after the audio signal fed to the high frequency forward speakers 14. The subsequent row 34 of drivers 12 may be supplied with an audio signal delayed, for example, 25 milliseconds after the high frequency forward speakers 14. Additionally, the subwoofer audio signal, a sum of left/right and forward/rear signals per standard practice, may be delayed to match the drivers 12 closest to it.

The system design is complicated by the fact that all the subassembled drivers 12 are mechanically moving a single headliner or speaker diaphragm 11. Since each drivers 12 is individually reconfigurable, the headliner speaker diaphragm properties must be such that while providing adequate stiffness and light weight for adequate sound pressure and high frequency output, the vibration in the panel 11 must decay quickly enough or the speed of sound in the panel 11 should be slow enough that the signals from adjacent or distant drivers 12 do not cause imaging problems. Those skilled in the art of tuning sound systems will realize that the acoustic vibration caused from the vibration of a forward motor 12 may reach the rear of the vehicle 16 thus causing imaging problems. Similarly, signals from the left channels may interfere with the right channels. These problems must be avoided by choosing proper materials and diaphragm construction dependent on individual vehicle constraints.

For one implementation of the preferred embodiment, the headliner 11 or speaker diaphragm was constructed of TRU (thermal foamable rigid urethane) with material properties of 7 mm thickness, Young's modulus of elasticity=2e9, density of 231 kg/m$^3$, damping of 4.5%. The headliner 11 was covered with a foam coverstock 28 for cosmetic and damping purposes. Although well established sound reinforcement guidelines of signal delay vs. signal level difference exist for success of precedence with discrete drivers, these must be modified to account for any significant headliner diaphragm vibrations traveling faster than the speed of sound in air. This is typically accomplished through trial and error techniques with listening evaluations. Moreover, the foam applied to or foamed in place on the headliner substrate may be open cell esters or ethers or closed cell foams or urethanes.

As shown in FIG. 2, the driver assembly 12 is located as discussed above at a motor connection location 33 on a headliner 11. For example, as shown in FIG. 2, the base 23 for coupling the transducer may be adhered to the upper surface of the headliner 11. Thereafter, the guide member 29 may be threaded into position on the base 23 so that the driver 12 is assembled and positioned properly in the vehicle. The location 33 carries at least one transducer 12, as shown in FIG. 2, area 33 is surrounded by a foam beam 35 having a height 36, a width 38, and a length that enables the foam beam to surround the area 32. As shown in FIG. 2, the member 35 may be adhered to the upper surface of the headliner 11 by an adhesive layer 40.

Figure 4:
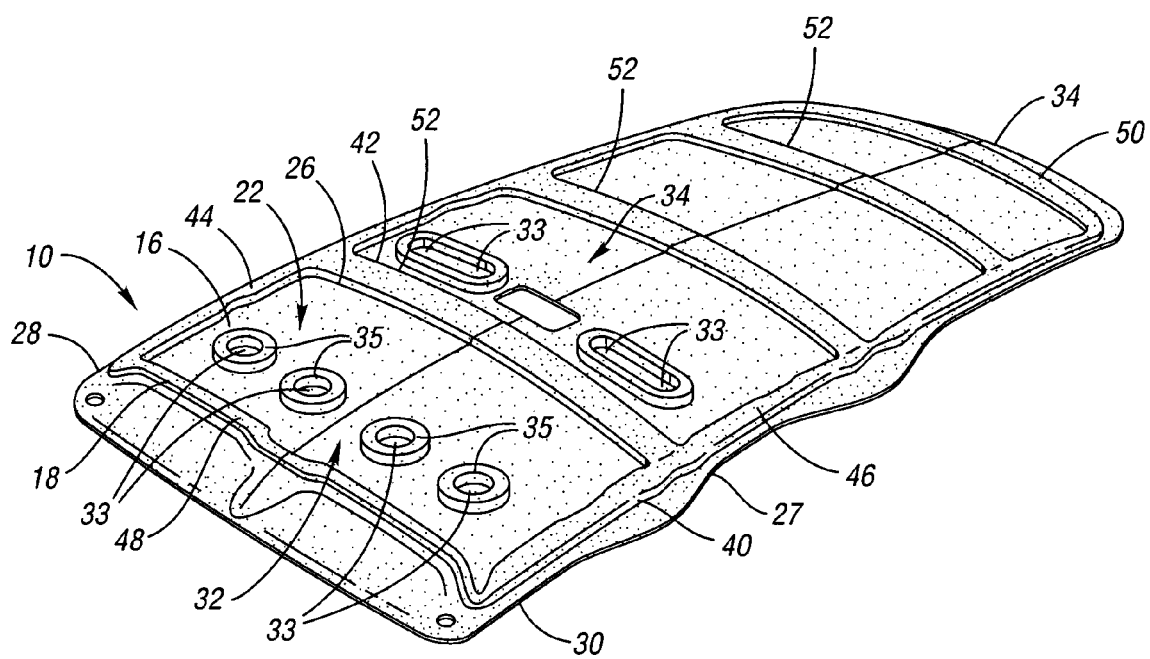
FIG. 4 is a perspective view of a headliner formed according to the present invention.

Alternatively, as shown in FIG. 4, while a front row 32 of motor locations 33 is adapted to receive a single driver 12 within the foam beam 35, a second row 34 includes motor connection locations 33 adapted to receive more than one driver 12. Nevertheless, the dimensions of the beams are substantially similar to those in FIG. 2, although the circumference of the beam will be large enough to encompass multiple motor connection locations 33.

Figure 5:
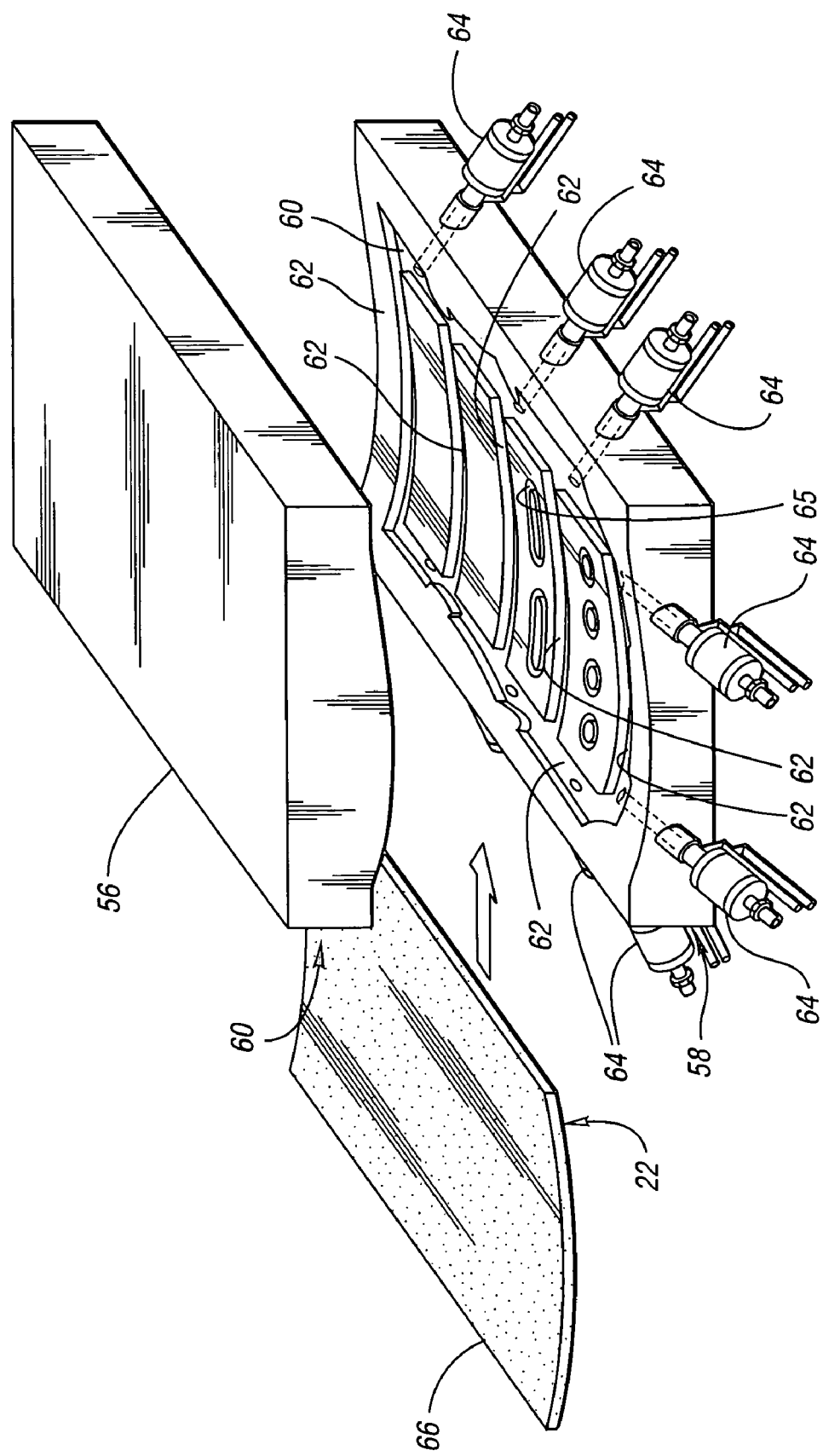
FIG. 5 is a perspective view of a foam-in-place workstation for application of the present invention.

As shown in FIG. 5, a first row 32 and second row 34 of beams 35 may be formed by foam-in-place molding technology. In particular, while beams 44 may be formed around the perimeter of the headliner substrate 66 to reinforce the entire headliner structure, the border is formed by recesses in a mold part 58 including a border recess 60. In addition, the mold part 58 includes numerous recesses 62 in the shape of channels that surround each selected area 65 of the mold that correspond to a motor transducer connection location 33 in an adjacent headliner blank 66. A plurality of injection heads 64 communicate through channels fluidly coupled with the recesses 62 so as to inject foam in the recesses when the mold part 56 has been closed against the lower mold part 58 with the substrate 66 therebetween. Of course, other molding techniques can be used and the recesses may be filled simultaneously or sequentially with a single head 64 or multiple heads. Nevertheless, regardless of the injection method and tooling, the headliner substrate 66 becomes reinforced by the frame 44 formed upon the blank 66 and foam beams 35 surround the motor connection locations 33 as shown in FIG. 4.

Referring again to FIGS. 2 and 3, a cover 50 in the form of a cap 67 is carried by the beam 35 to cover motor connection location 33 and any transducer that may be installed to a connector 23 in the connection area 33. For example, sometimes the mold parts such as the mold part 56 may include recesses for receiving components adhered to the blank, for example prepositioned drivers 12. In the preferred embodiment, the cap 67 includes depending lip 68 which is received in a groove 70. The lip may include barbs 72 that bite the foam and resist removal of the cover 67. Adhesives and other means of fastening the cover 67 above the shaped beam 35 may be employed without departing from the present invention. Likewise, cloth may be sufficient to resist dust, but rigid material may be selected as desired to resist more forceful access to the drivers 12. Preferably, removal of the cover leaves telltale signs of tampering that may be relied upon when warranty coverage is asserted.

Figure 6:
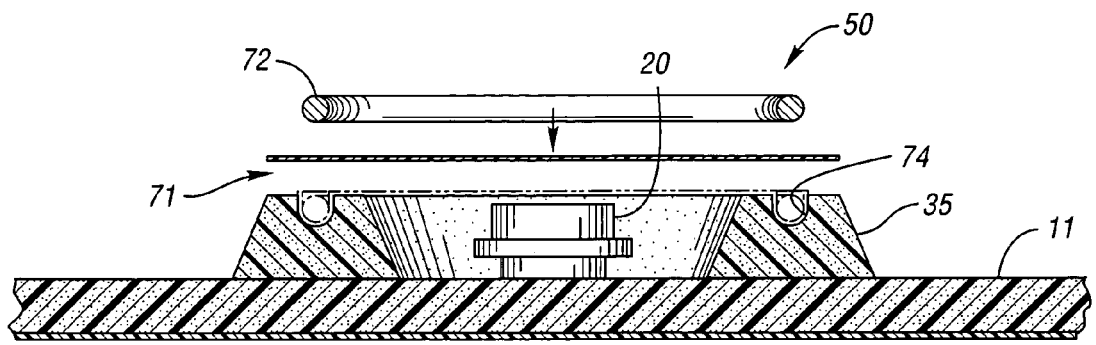
FIG. 6 is sectional view similar to FIG. 3 but showing a modified dust cover mount according to the present invention.

As shown in FIG. 6, a tightly weaved fabric layer 71 forms the cover 50. Retainer ring 72 tightly engages the cloth layer 71 within recesses 74 at the top of foam beam 35 and adapted to frictionally engage the ring 72 positioned on the layer 71.

Figure 7:
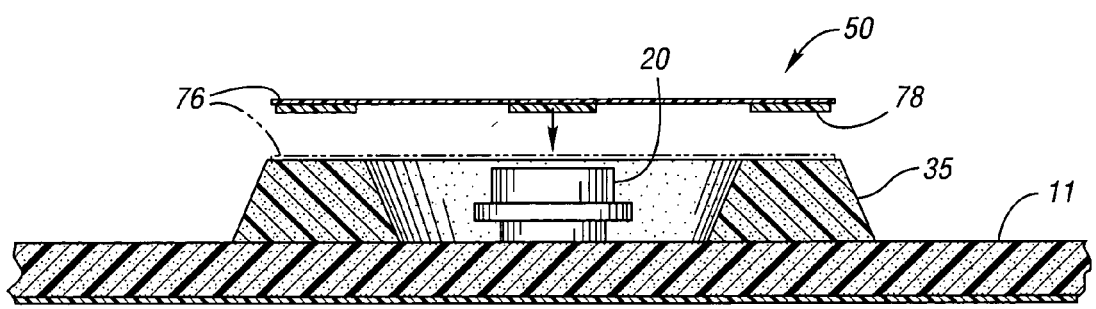
FIG. 7 is a sectional view similar to FIGS. 3 and 6 but showing another modified dust cover mount according to the present invention.

As shown in FIG. 7, a cover sheet of plastic or other material may also be retained in position on the foam by one or more adhesive layers. In particular, as shown in FIG. 7, a plate 76 carries an adhesive layer 78, preferably a plastic, resin or other known binder, that can adhere the plate 76 to the top of beam 35. As an option, alternatively or additionally, the plate 76 may also be adhered to the motor cup 20 and may also serve to stabilize the audio components within the protector formed by the foam beam 35 and the cover 50.

Figure 8:
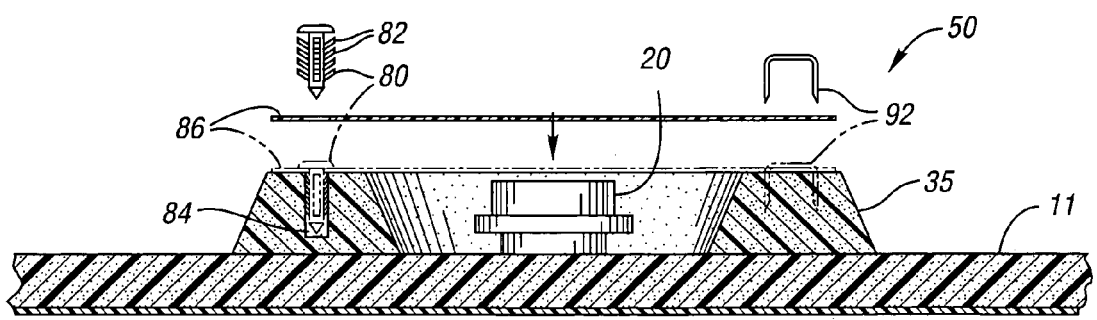
FIG. 8 is a sectional view similar to FIGS. 3, 6 and 7 but showing another modified dust cover mount according to the present invention.

As shown in FIG. 8, the cover 50 may be otherwise secured and retained in a position on the foam beam 35, such as for example, fasteners penetrating the cover sheet and extending into the foam beam 35. As an example, push pins 80 has ribs 82 that are flexible but resiliently protruding to resiliently retain the fastener, and the cap 86, within the foam of the beam 35. The fasteners are retained in openings 84 contained in the cap 86. Other fasteners may also be used. For example, as shown at 90, staples or other fasteners may be employed to retain the sheet 86 in plastic, aluminum, cardboard, or the like in position on the donut or wrapped foam beam 35. Preferably, fasteners have barbs 92 to retain the cover against the foam.

In any event, the present invention provides protective enclosures for audio drivers combined with a headliner system, and serves particularly well with sonic headliner membranes. As a result, the motors are protected from dust and other debris that could affect the performance of the drivers, while the headliner is being formed and installed in the roof assembly of a vehicle. Moreover, the foam beam and the cover may form a barrier that protects against unwanted influences upon the driver and the sonic energy being emitted from the drivers to the vehicle interior.

Having thus described the present invention, many modifications will become apparent to those skilled in the art to which it pertains without departing from the scope and spirit of the present invention as defined in the appended claims.

What is claimed is:

1. A method for protecting motors having a transducer height on a vehicle headliner with integral transducers moving a sound-radiating lower surface;
    locating a motor connection area;
    surrounding said motor connection area with a foam beam having a height substantially corresponding to said transducer height; and
    covering said motor connection area surrounded by said foam beam before installation of said vehicle headliner in said vehicle;
    wherein said surrounding comprises forming a foam beam, shaping said beam around said motor connection area and adhering said shaped beam to an upper surface of a headliner blank; and
    wherein said forming and said shaping is performed simultaneously.

2. The invention as described in claim 1 wherein said cover is a rigid member.

3. The invention as described in claim 1 wherein said cover is carried by said foam beam.

4. The invention as described in claim 1 wherein said foam beam is adhesively secured to said headliner.

5. The invention as defined in claim 1 wherein said locating step comprises locating a position of at least one motor.

6. The invention as defined in claim 5 wherein said locating step comprises locating positions for a plurality of motors in a connection area.

7. The invention as defined in claim 1 wherein said surrounding comprises foaming in place a foam beam on an upper surface of a headliner blank.

8. The invention as defined in claim 1 wherein said covering comprises supporting a membrane on said foam beam.

* * * * *